United States Patent [19]

Watanabe

[11] Patent Number: 4,597,868
[45] Date of Patent: Jul. 1, 1986

[54] BODY FLUID FILTER DEVICE

[75] Inventor: Masaharu Watanabe, Kawasaki, Japan

[73] Assignee: Terumo Corporation, Tokyo, Japan

[21] Appl. No.: 608,273

[22] Filed: May 7, 1984

Related U.S. Application Data

[63] Continuation of Ser. No. 285,058, Jul. 20, 1981, abandoned.

[30] Foreign Application Priority Data

Jul. 24, 1980 [JP] Japan ............................ 55-101558

[51] Int. Cl.⁴ ............................................. B01D 13/00
[52] U.S. Cl. ................................... 210/232; 210/347; 210/351; 210/433.2
[58] Field of Search ............ 210/350, 351, 352, 321.1, 210/321.2, 321.3, 346, 347, 433.2, 456, 232, 500.2

[56] References Cited

U.S. PATENT DOCUMENTS

| | | | |
|---|---|---|---|
| 3,343,681 | 9/1967 | Madden | 210/343 |
| 3,398,834 | 8/1968 | Nuttall et al. | 210/321.1 |
| 3,556,302 | 1/1971 | Agranat | 210/450 X |
| 3,567,810 | 3/1971 | Baker | 210/500.2 X |
| 3,695,445 | 10/1972 | Esmond | 210/321.3 |
| 3,743,097 | 7/1973 | Sausse | 210/321.3 |
| 3,966,612 | 6/1976 | Johansson | 210/321.1 X |
| 4,212,742 | 7/1980 | Solomon et al. | 210/433.2 X |
| 4,374,731 | 2/1983 | Brown et al. | 210/351 X |
| 4,375,415 | 3/1983 | Lavender | 210/456 X |

FOREIGN PATENT DOCUMENTS

| | | | |
|---|---|---|---|
| 2911508 | 10/1979 | Fed. Rep. of Germany | 210/321.3 |
| 2268535 | 11/1975 | France | 210/321.3 |
| 1217044 | 12/1970 | United Kingdom | 210/321.3 |

Primary Examiner—Frank Spear
Attorney, Agent, or Firm—Frishauf, Holtz, Goodman & Woodward

[57] ABSTRACT

A body fluid filter device is formed by enclosing liquid-tightly and slidably with a filter device case a body fluid filter membrane, an elastic body fluid flow path regulation plate disposed on one surface of the filter membrane and provided with a plurality of protuberances distributed at fixed intervals, and a filtrate flow path forming plate disposed on the other surface of the filter membrane and then setting the filter device case in position in pressure means adapted to apply pressure freely adjustably to the case in a vertical direction.

23 Claims, 9 Drawing Figures

BODY FLUID FILTER DEVICE

This application is a continuation, of application Ser. No. 285,058, filed July 20, 1981, now abandoned.

BACKGROUND OF THE INVENTION

1. Field of the Invention

This invention relates to a body fluid filter device for passing body fluid such as blood, ascites fluid, or thoracic fluid and separating the filtrate such as plasma.

2. Description of the Prior Arts

Figure 1:
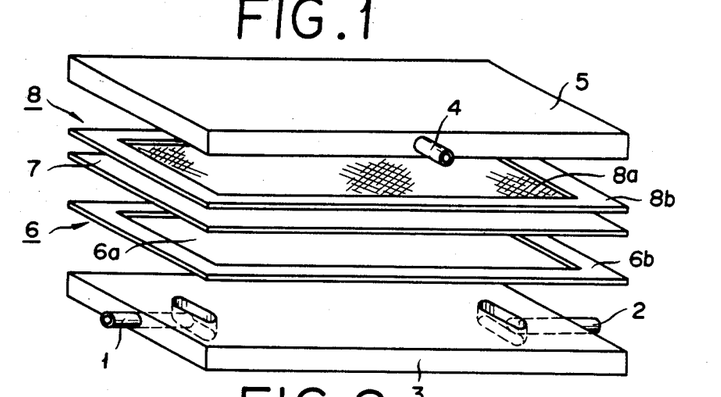
FIG. 1 is a perspective view illustrating a conventional body fluid filter device in a disassembled state.

Among the devices heretofore developed and adopted for the filtration of body fluids, there is included that which is illustrated in FIG. 1. This device comprises a side plate 3 provided with a body fluid inlet 1 and a filtration residual fluid outlet 2, a side plate 5 provided with a filtrate outlet 4, a flow path forming plate 6 formed of a packing portion 6b of the shape of a rectangular frame and an empty space 6a enclosed with the packing portion 6b, a filter membrane 7, and a filtrate flow path forming plate 8 formed of a reticular filtrate flow path 8a and a packing portion 8b enclosing the filtrate flow path 8a, with the flow path forming plate 6, the filter membrane 7, and the filtrate flow path forming plate 8 piled up one on top of another and nipped liquid-tightly between the two side plates 3, 5. In this device, the body fluid such as blood which has flowed in through the body fluid inlet 1 is forwarded through the empty space 6a and filtered through the filter membrane 7. The concentrated blood corpuscles fraction of blood stopped on the filter membrane is withdrawn through the filtration residual fluid outlet 2 and the filtrate passed through the filter membrane is forwarded through the filtrate flow path 8a and discharged via the filtrate outlet 4.

From the viewpoint of the filtering property, however, this device has posed the following problem. It is well known that in devices of this kind the wall shear rate of the filter membrane increases and the filtering property is improved in proportion as the height of the body fluid flow path is decreased. In the device of FIG. 1, the height of the flow path in the empty space 6a serving to pass the body fluid can be decreased by decreasing the thickness of the flow path forming plate 6. Unfortunately, the filter membrane 7 is readily deformable, so that the body fluid flow path which is formed by the empty space 6a cannot retain a uniform height fixed by the thickness of the flow path forming plate 6 but, instead greatly fluctuates in height. For example, if the thickness of the flow path is set at 300 microns, an error of ±100 microns can occur. Therefore, even if the thickness of the flow path forming plate 6 is decreased extremely in this device, it is difficult to retain the desirable filtration amount and the amount varies widely.

With a view to eliminating this disadvantage of the conventional device, there has been proposed a filter device which comprises a slender manifold plate provided at one end thereof with a blood inlet and at the other end thereof with a blood outlet, filter membranes attached fast one each to the opposite sides of the manifold plate through the medium of interposed rubber gaskets incorporating 3 parallel channels, and collection plates provided with blood plasma vents and disposed so as to hold the filter membranes fast against the manifold plate [Trans. Am. Soc. Artif. Intern. Organs, XXIV, 21-26 (1978)]. Since the flow path has a great length compared with its width, this device entails a heavy pressure drop which gives rise to hemolysis and mars the practical worth of the device.

There has also been proposed an ultrafilter device particularly suitable for filtration of blood, which comprises at least one hollow filter chamber bordering a filter agent on one side thereof, provided thereunder with a filtrate discharge member, and incorporating an inlet for the medium subjected to filtration and an outlet for the medium concentrated by filtration (British Pat. No. 1,555,389). In this device, a substrate layer comprising a filter mesh fabric having openings of a side dimension not greater than 2.5 mm and a thickness between 0.1 and 0.5 mm is interposed at least between the filter agent and one chamber wall. This ultrafilter device however, has suffered from a disadvantage that it develops great negative pressure because it is used for ultrafiltration and gets clogged by addition of blood corpuscles or proteins to the membrane surface, because decreasing the thickness of flow path is limited on the structure, and wall shear rate is low. Consequently, there are some problems on blood injury such as residence of blood, hemolysis and coagulation on account of the clogging.

An object of the present invention, therefore, is to provide a novel body fluid filter device.

Another object of this invention is to provide a body fluid filter device capable of ensuring a desired filtration volume substantially without fluctuation of the filtration amount by providing an extremely thin blood flow path uniformly.

SUMMARY OF THE INVENTION

The objects described above are accomplished by a body fluid filter device, comprising a body fluid filter membrane, a fluid flow path regulation plate disposed adjacent to one surface of the filter membrane and provided on the surface thereof with a plurality of flexible and elastic protuberances distributed at fixed intervals, a filtrate flow path forming plate disposed on the other surface of the filter membrane, a seal member adapted to prevent the body fluid and the filtrate from mingling into each other, a filter device case provided with body fluid inlet and filtration residual fluid outlet and a filtrate outlet and formed of at least one upper and one lower plate members, and pressure means adapted to press the filter device case adjustably in a vertical direction, which device is characterized by having the body fluid flow path regulation plate, the body fluid filter membrane, and the filtrate flow path forming plate piled up fast through the medium of the seal member, encased in situ within the filter device case, the fitted in the pressure means thereby giving rise to a fluid path capable of enabling the body fluid flowing in through the body fluid inlet to be advanced through the gap formed between the filter membrane and the flow path regulation plate. After separation of the filtrate, the fluid is led to the filtration residual fluid outlet and a fluid path capable of enabling the filtrate produced by the filter membrane to be advanced through the filtrate flow path forming plate to the filtrate outlet.

According to the present invention, the multiplicity of protuberances which are primarily aimed at providing a desired flow path of a constant height concurrently serve to prevent the filter membrane from deforming. Moreover, the gaps separating the protuberances ensure safe maintenance of flow path for the body fluid under treatment. The elasticity of the material of which these protuberances are formed enables the height of the flow path to be adjusted relative to the pressure drop of the filter device.

PREFERRED EMBODIMENT OF THE INVENTION

Figure 2:
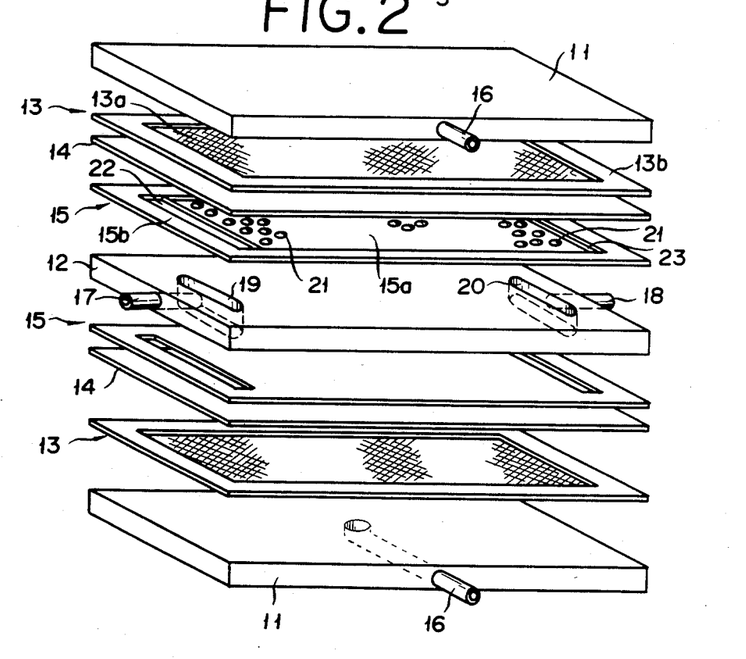
FIG. 2 is a perspective view illustrating one embodiment of the body fluid filter device of this invention in a disassembled state.

This invention will be described below with reference to the accompanying drawings. FIG. 2 is a perspective view of the body fluid filter device in a disassembled state. In this device a body fluid distribution plate 12 is disposed between one pair of side plates 11, 11. In each of the spaces which separate the side plates 11, 11 from the body fluid distribution plate 12, a filtrate flow path forming plate 13, a filter membrane 14, and a body fluid flow path regulating plate 15 piled up sequentially one on top of another are inserted as a set. The aforementioned side plates 11, 11 are formed of a rigid plastic material such as polycarbonate, polyester, polymethyl methacrylate, ABS resin or rigid polyvinyl chloride in a square, preferably rectangular, shape. They are each provided on the lateral side thereof with a filtrate outlet 16. The filtrate outlets 16 are formed in the shape of the letter L, with their inner ends falling at the centers of the respective side plate 11, 11 on the surfaces opposed to the body fluid distribution plate 12. The body fluid distribution plate 12 is formed of the same rigid plastic material as the side plates in the identical length and width with those of the side plates 11, 11. The body fluid distribution plate 12 is provided at one end thereof with a body fluid inlet 17 and at the other end thereof with a filtration residual fluid outlet 18. The body fluid inlet 17 and filtration residual outlet 18 communicate respectively with vertical perforations 19, 20 formed in the body fluid distribution plate 12.

The aforementioned filtrate flow path forming plate 13 is formed in a square, preferably rectangular, shape substantially identically with the shape of the side plates 11, 11. It comprises a reticular filtrate flow portion 13a and a packing portion 13b enclosing the flow portion 13a. The filtrate flow portion 13a is formed of screen meshes of a synthetic resin such as, for example, polyester, polypropylene or polyamide and the packing portion 13b is formed of an elastic material such as silicone rubber. The packing portion 13b generally has a thickness of 80 to 1200 microns. Fast attachment of the aforementioned filtrate flow portion 13a to the packing portion 13b is accomplished, for example, by tightly drawing the screen meshes, nipping their boundaries between two horizontally halved packing members each of the shape of a picture frame, and heat sealing or welding the halved packing members.

Figure 3:
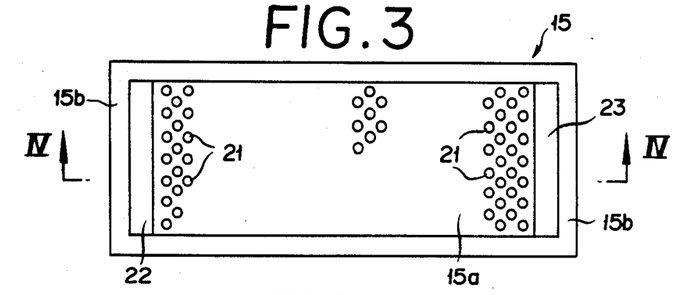
FIG. 3 is a plan view of a flow path regulating plate involved in the device of FIG. 2.
Figure 4:
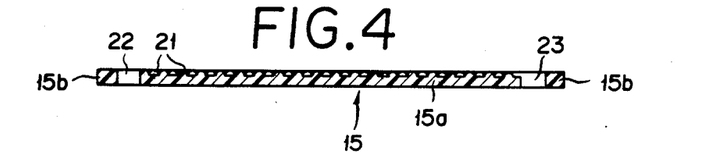
FIG. 4 is a sectional view taken along the IV—IV line of the diagram of FIG. 3.

The aforementioned filter membrane 14 is a thin membrane (30 to 200 microns in thickness) made of a cellulose ester such as cellulose nitrate or cellulose acetate, or a synthetic resin such as polycarbonate by any of known methods including the phase separation method, the extraction method, the drawing method, and the charged particle irradiation method. The membrane has an average pore diameter approximately in the range of from 0.1 to 1 micron. The aforementioned body fluid flow path regulating plate 15 is intended to define a flow path for the body fluid in conjunction with the filter membrane 14. As illustrated in FIG. 3 and FIG. 4, it is formed in a square, preferably rectangular, shape and comprises a body fluid flow portion 15a provided with a multiplicity of protuberances 21 and a packing 15b enclosing the flow portion 15a. Although the body fluid flow portion 15a is desired to be formed integrally with the packing 15b by using the same material, the flow portion 15a and the packing 15b may be separately formed with either the same material or different materials and subsequently fastened to each other by thermal fusion or by use of an adhesive agent. The body fluid flow portion 15a is required to be made of a material possessing Young's modulus of elasticity in the range of from $1.0 \times 10^6$ to $2.0 \times 10^{10}$ dynes/cm$^2$, preferably from $1.0 \times 10^6$ to $1.0 \times 10^9$ dynes/cm$^2$. The reason for this specific elasticity is that the flow portion 15a ought to permit ready contraction of the body fluid flow path under the pressure exerted to bear on the filter device and, upon relief of the pressure, permit ready resumption of the original shape by the flow path and consequently enable the device to provide a desired filtration volume. Examples of materials possessing Young's modulus of elasticity within the range specified above include low-density polyethylene, silicone rubber, isoprene rubber, butyl rubber, styrenebutadiene rubber (SBR), and ethylene-vinyl acetate copolymer resin (EVA). Surface hardness of the body fluid flow portion 15a provided with the protuberances is preferably 10–100 of shore hardness (A-scale). The protuberances 21 of the body fluid flow portion 15a serve to support the filter membrane 14 in position and prevent it from deforming, while the gaps which intervene between the protuberances 21 serve to form a flow path for the body fluid. These protuberances 21 are formed so that their tops fall substantially flush with the surface of the packing 15b as illustrated in FIG. 4. Thus, the height of the protuberances 21 is desirably in the range of from 50 to 500 microns, preferably from 100 to 250 microns. The reason for this specific range is that desired adjustment of the height of flow path becomes difficult when the thickness is less than 50 microns. Additionally, heavy deformation occurs and the wall shear rate cannot increase when the thickness is more than 500 microns. The intervals separating these protuberances 21 are desired to fall in the range of from 100 to 2000 microns, preferably from 400 to 800 microns. The ratio of the radius, diagonal line, or side at the base of each of the protuberances to the distance separating the adjacent protuberances is desired to fall in the range of from 1:1 to 1:3. The packing 15b is formed of silicone rubber, for example. Between the packing 15b and the body fluid flow portion 15a, there are formed a body fluid inlet 22 and a filtration residual fluid outlet 23 corresponding to the perforations 19, 20 formed in the body fluid distribution plate 12.

The device of this invention is assembled by pressing the two side plates 11, 11 with a compressive coil spring 24, a vice, or a bolt thereby fastening the filtrate flow path forming plate 13, the filter membrane 14, and the body fluid flow path regulating plate 15 as a set in each other spaces separating the side plates 11, 11 from the body fluid distribution plate 12, and liquid-tightly sealing the resultant boundaries by virtue of the function of the packings 13b, 13b.

Figure 6:
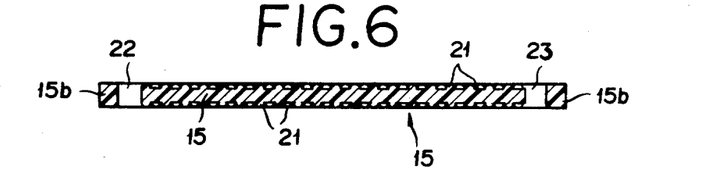
Figure 7:
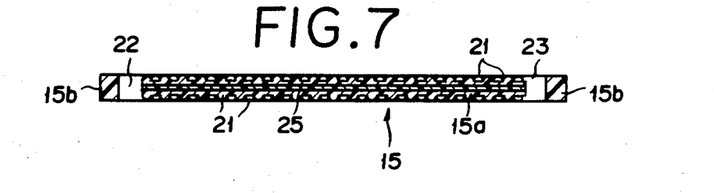

The flow path regulating plate to be used in the device of this invention is not limited to the structure illustrated in FIG. 3 and FIG. 4. It may be formed in a structure which, as illustrated in FIG. 6, possesses protuberances 21 on both surfaces of the body fluid flow portion 15a. In this case, it is desirable that the protuberances 21 of the flow path regulation plate 15 should be formed at symmetrical positions on the opposite surfaces to discourage otherwise possible deformation or the protuburances should be given a width greater than the distance separating the protuberances. When the protuberances 21 are formed on both opposite surfaces, the body fluid flow portion 15a may incorporate therein as illustrated in FIG. 7 a rigid plate 25 which serves to reinforce the flow path regulation plate 15.

Figures 8, 9:
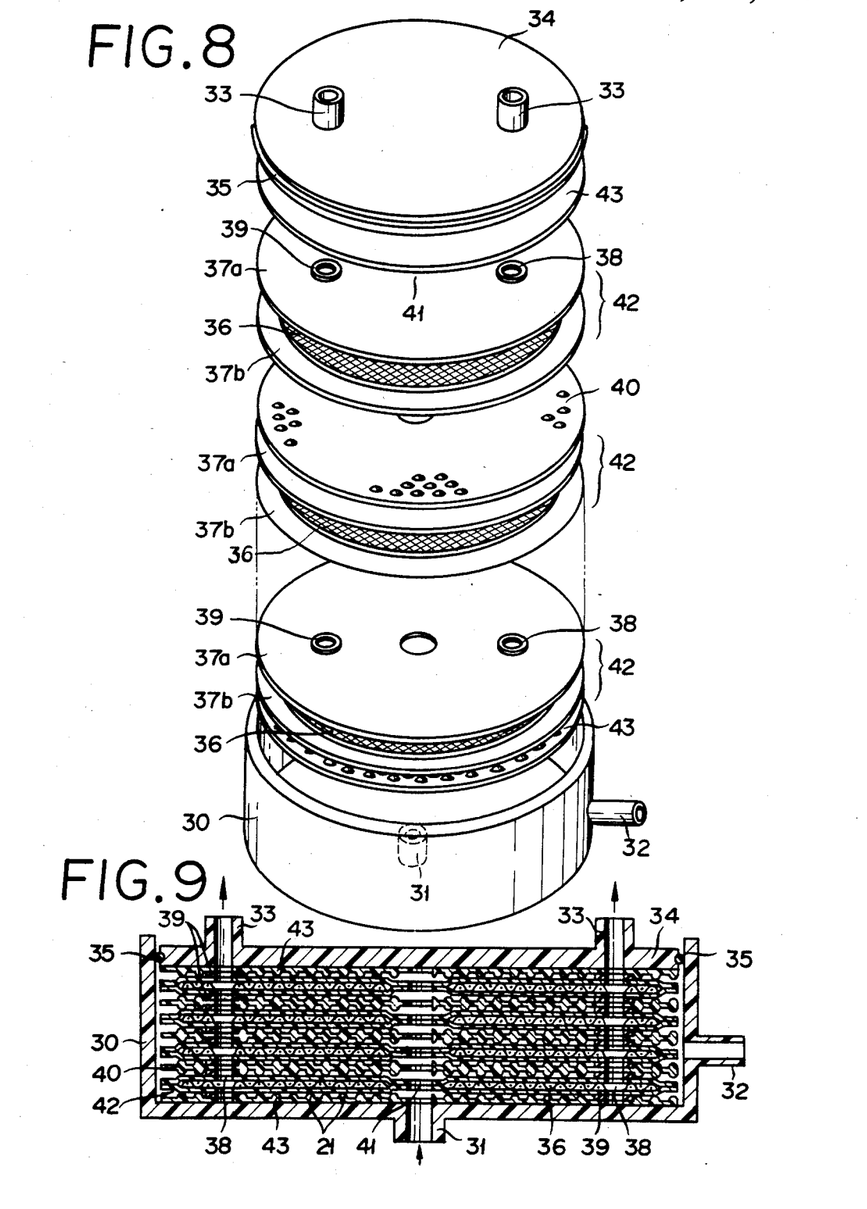
FIG. 8 is a perspective view of another embodiment of the body fluid filter device of the present invention illustrated in a dissembled state.
FIG. 9 is a sectional view of the device of FIG. 8 in an assembled state.

FIG. 8 and FIG. 9 represent another embodiment of this invention. This device comprises a cylindrical case 30 provided at the center of the bottom thereof with a body fluid inlet 31 and on the lateral wall thereof with a filtration residual fluid outlet 32 and a retainer (lid) 34 incorporating filtrate outlets 33, 33 and provided in the peripheral edge thereof with an O-ring. The case accommodates a filter member, a body fluid flow path regulation palte, and a filter flow path forming plate substantially identical with the corresponding components involved in the device of FIG. 2. To be specific, a filter membrane unit 42 is obtained by interposing between one upper and one lower circular filter membranes 37a, 37b a circular filtrate flow path forming plate 36 made of screen meshes incorporating an opening 41 at the center and filtrate path holes 38 near the periphery, then sealing the boundaries of these plates and the boundary of the central opening as by thermal fusion or by use of an adhesive agent and, at the same time, applying seal members 39 to the periphery of the filtrate path holes 38. The circular filtrate flow path forming plate 36 is not limited to above mentioned screen meshes so long as it can retain the filtrate flow path. Between a multiplicity of filter membrane units 42, there is interposed a circular body fluid flow path regulation plate 40 which is provided with a central opening 41 and filtrate flow holes 38 conforming to the corresponding components in the unit 42 and also provided on the opposite surface thereof with a multiplicity of protuberances (providing that the portions surrounding the filtrate path holes 38 are flat). On the uppermost surface and the lowermost surface of the aforementioned filter membrane unit 42, circular body fluid flow path regulation plates 43 each provided with a central opening 41 and filtrate path holes 38 conforming to the corresponding components of the circular body fluid flow path regulation plates 40 or the filter membrane unit 42 and also provided on both opposite surfaces thereof with a multiplicity of protuberances (providing that the portions surrounding the filtrate path holes 38 per flat) are deposited so that the protuberances will remain in intimate contact with the surfaces. A plurality of filter membrane units 42 and body fluid flow path regulation plates 40, 43 are piled up one on top of another and, in situ, are inserted in the aforementioned case 30. Then, the retainer 34 is placed on the case, fitted into the case 30, and sealed with the O-ring liquid-tightly to complete a body fluid filter device as illustrated in FIG. 9. Because of the pressure applied to the retainer 34 during its insertion into the case 30, the filter membrane unit 42 and the body fluid flow path regulation plates 40, 43, are intimately united around the filtrate path hole 38 through the medium of the seal members 39 and the path holes 38 are joined to form a continuous path. In the diagrams of FIGS. 1–9, the thicknesses of membranes and the sizes of protuberances and the distances separating such protuberances are exaggerated.

Figure 5:
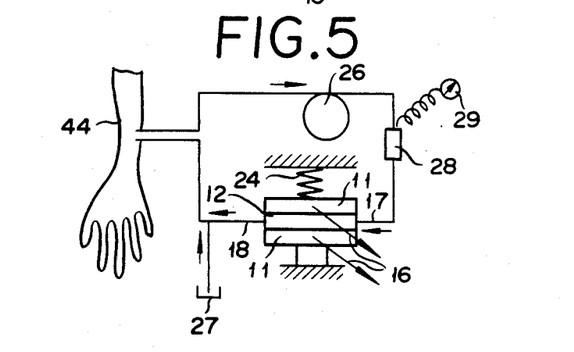
FIG. 5 is a third circuit diagram illustrating a device incorporating the filter device of FIG. 2, FIG. 6 and FIG. 7 are sectional views of other embodiments of the flow path regulating plate contemplated by this invention.

The body fluid filter device of the present invention is used for the filtration of a body fluid such as blood, ascites fluid, and thoracic fluid. Now, the operation of this device will be described below on the assumption that the device is in service for the separation of plasma from blood. As illustrated in FIG. 2 and FIG. 5, this device receives the blood forwarded by a pump 26 into the body fluid inlet 17 and advances it through the perforation 19, the body fluid inlet 22, and the gap separating the protuberances 21. During this passage, the blood is filtered by the filter membrane 14. The filtrate which has passed through the filter membrane 14 is forwarded through the filtrate path portion 13a and discharged via the filtrate outlet 16. In the meantime, the blood which has been stopped on the filter membrane 14 is forwarded through the filtration residual fluid outlet 23 and the perforation 20 and withdrawn via the filtration residual fluid outlet 18. This blood is returned in conjunction with a replenishment 27 to the human body 44. In the diagram of FIG. 5, 28 denotes an air trap and 29 a pressure gauge.

The amount of blood to be filtered by the filter membrane 14 is regulated by adjusting the magnitude of the pressure exerted by the compressive coil spring 24. Effective regulation of the amount of blood to be filtered by the adjustment of the compressive force of the spring can be explained as follows. When the compressive force of the spring is changed in proportion to the change in the volume of blood being filtered, the amount of elastic deformation of the protuberances 21 is proportionally changed to vary the height of the flow path and can be set appropriately so as to increase the volume of blood filtered by decreasing thickness of flow path. In this case, since the number of protuberances used in the device is large enough for the protuberances to be uniformly deformed faithfully in proportion to the change in the compressive force. Even under the exertion of the compressive force, the gaps intervening between the protuberances 21 are retained uniformly to ensure stable flow of the body fluid without partial blocking occuring in the flow path.

While the body fluid such as blood which is admitted through the body fluid inlet 31 into the case 30 from the device of FIG. 5, the body fluid filter device illustrated in FIG. 8 and FIG. 9 admits the body fluid via the central opening 41, advances it through the gaps between the protuberances 21, 21 formed between the body fluid flow path regulation plates 40, 43 and the filter membrane units 42 and filters it with the filter membranes 37a, 37b in the filter membrane units 42. The filtrate passes through the spaces in the filtrate flow path forming plate 36 within the filter membrane unit 42, reaches the filtrate path hole 38 and departs from the filtrate outlet 33 provided on the retainer 34. In the meantime, the blood corpuscles and other substances stopped on the filter membranes flow through the space formed between the body fluid flow path regulation plates 40, 43 and the filter membrane unit 42 and depart via the filtration residual fluid outlet 32. Position of the filtrate outlet 33 and the body fluid inlet 31 is not limited to that which is illustrated.

According to this invention since the filter membranes 14, 37a, 37b are placed on the body fluid flow path regulation plates 15, 40 provided with the multiplicity of protuberances 21, the filter membranes 14, 37a, 37b are supported in position by the protuberances 21. Consequently, the filter membranes are prevented from deformation and the distance between the filter membranes and the regulation plates is kept constant. The gaps separating the protuberances 21, 21, therefore, persist to ensure maintenance of a uniform flow path for the body fluid. Owing to the elasticity of the protuberances 21, the height of the flow path is varied. By suitable adjustment of the compressive force exerted thereto, the pressure drop of the filter device as a whole can be easily regulated to the level of 5 to 10 microns relative to the height of the flow path.

Because of the specific construction described above, the height of the flow path can be freely varied in conformity with the volume of the body fluid in motion. When the body fluid flow path is excessively contracted, it regains its original shape uniformly by virtue of the elasticity of the body fluid flow path regulation plates instead of relying on the internal pressure generated within the filter device by the body fluid. Further, the thickness of the flow path can be decreased, the wall shear rate on the filter membrane is high, there is no clogging by depostion of blood corpuscles on the membrane, and there is little problem of damage of blood such as hemolysis and coagulation. Thus, the change in the height of the flow path has absolutely no adverse effect upon the body fluid such as blood under treatment. Further, this device can regulate the volume of the body fluid to be filtered by controlling the pressure loss instead of controlling the flow volume of the body flood. The control means required for this device, therefore, is not expensive and is simple in operation. In the present embodiment, since the filter device is resiliently compressed by means of a compressive coil spring, the height of the flow path can be automatically varied in accordance with the pulsation of the blood. Thus the compressive force applied has no adverse effect upon the blood under treatment.

The effect of the present invention described above is apparent when the body fluid flow path regulation plates 15, 40, 43 are formed of a material possessing Young's modulus of elasticity in the range of from $1.0 \times 10^6$ to $2.0 \times 10^{10}$ dynes/cm$^2$ and the protuberances have a height in the range of from 50 to 500 microns. This fact has been demonstrated by the following working examples.

EXAMPLES 1-12

In a device constructed as illustrated in FIG. 2, blood was passed under the varying conditions indicated in Table 1, with the volume of filtered blood noted. The results are as shown in Table 1. The height of flow path indicated in Table 1 was found by the calculation performed on the data such as of pressure drop obtained during the experiment. The dispersion represents the standard deviation of the volume of filtration flux from the average value, indicated in percentage. The membranes were made of cellulose acetate having an average pore diameter of 0.3 to 0.5 micron.

TABLE 1

| | Structure of device | | | | Flow path regulation plate | | | |
|---|---|---|---|---|---|---|---|---|
| Example | Width of flow path (mm) | Length of flow path (cm) | Number of flow path | Membrane area (cm$^2$) | Material | Young's modulus of elasticity (dyne/cm$^2$) | Height of protuberances (microns) | Surface hardness (Shore hardness A-scale) |
| 1 | 6.5 | 98 | 10 | 6400 | EVA* | $1.0 \times 10^8$–$1.0 \times 10^9$ | 450 | 50–60 |
| 2 | 9.5 | 54 | 10 | 5200 | EVA* | $1.0 \times 10^8$–$1.0 \times 10^9$ | 350 | 50–60 |
| 3 | 36.5 | 7 | 34 | 9720 | EVA* | $1.0 \times 10^8$–$1.0 \times 10^9$ | 130 | 50–60 |
| 4 | 31.8 | 6 | 30 | 7045 | silicone rubber | $1.0 \times 10^6$–$2.0 \times 10^6$ | 100 | 20–30 |
| 5 | 32.0 | 5 | 26 | 4492 | silicone rubber | $1.0 \times 10^7$–$2.0 \times 10^7$ | 100 | 20–30 |
| 6 | 24.3 | 9 | 12 | 3732 | isoprene rubber | $1.0 \times 10^6$–$2.0 \times 10^7$ | 80 | 20–30 |
| 7 | 6.5 | 98 | 10 | 6400 | polypropylene | $1.0 \times 10^{11}$–$1.0 \times 10^{12}$ | 450 | 150–250 |
| 8 | 36.5 | 7 | 34 | 9720 | polyethylene | $2.5 \times 10^{10}$–$3.0 \times 10^{10}$ | 130 | 80 |
| 9 | 24.3 | 9 | 12 | 3732 | polyethylene | $2.5 \times 10^{10}$–$3.0 \times 10^{10}$ | 80 | 80 |
| 10 | 9.5 | 54 | 10 | 5200 | silicone rubber** | — | 350** | — |
| 11 | 31.8 | 6 | 30 | 7040 | silicone rubber** | — | 100** | — |
| 12 | 32.0 | 5 | 26 | 4492 | silicone rubber** | — | 100** | — |

| | Condition of blood filtration | | | | | |
|---|---|---|---|---|---|---|
| Example | Wall shear rate (sec$^{-1}$) | Blood flow rate (ml/min) | Pressure drop (kg/cm$^2$) | Height of flow path (cm) | Average volume of filtration flux per three runs (ml/min.) | Dispersion (%) |
| 1 | 144 | 150 | 0.180 | 0.040 | 41.6 | ±2.6 |
| 2 | 175 | 150 | 0.160 | 0.300 | 38.0 | ±2.1 |
| 3 | 66 | 100 | 0.020 | 0.110 | 40.5 | ±1.7 |
| 4 | 129 | 100 | 0.050 | 0.030 | 49.1 | ±2.2 |
| 5 | 187 | 100 | 0.060 | 0.080 | 41.5 | ±1.9 |
| 6 | 235 | 100 | 0.090 | 0.065 | 49.3 | ±1.4 |

TABLE 1-continued

|   |   |   |   |   |   |   |
|---|---|---|---|---|---|---|
| 7 | 144 | 150 | 0.320 | — | 10.8 | ±37.0 |
| 8 | 66 | 100 | 0.400 | — | 6.2 | ±48.4 |
| 9 | 235 | 100 | 0.380 | — | 15.9 | ±36.5 |
| 10 | 175 | 150 | 0.450 | — | 1.4 | ±135.7 |
| 11 | 129 | 100 | 0.750 | — | 3.0 | ±133.3 |
| 12 | 187 | 100 | 0.380 | — | 1.5 | ±126.7 |

*EVA: Copolymer resin of 15% by weight of vinyl acetate and 85% by weight of ethylene.
**Flow path regulation plates used in Examples 10-12 are ones having no protuberances as shown in FIG. 1, so the height of protuberances means the height of packing portion.

It is evident from Table 1 that according to this invention, accurate regulation of the height of flow path can be obtained to obtain desired filtration volume and the dispersion of the filtration volume can be decreased by varying the compressive force. The reason for this effect maybe explained as follows.

In the filter device;
let a stand for the width of flow path for the blood,
let b stand for the height of the flow path for the blood, and
let l stand for the length of the flow path for the blood.

In the conditions for the filtration;
let $Q_B$ stand for the blood flow rate,
let $\mu$ stand for the viscosity of the blood, and
let $g_c$ stand for the gravitational acceleration.

Then, the pressure drop, PD, of the filter device is expressed as follows:

$$PD = \frac{12 Q_B \mu l}{a b^3 g_c} \quad (I)$$

The shear rate, j, is expressed as follows:

$$j = \frac{6 Q_B}{a b^2} \quad (II)$$

The flow volume of filtration, $Q_F$, is expressed as follows:

$$Q_F = \alpha \cdot (j)^\beta \cdot S \quad (III)$$

In the formulas given above, $\alpha$ and $\beta$ denote the coefficients of the membrane and S denotes the area of the membrane (a·l). Assume that blood is introduced under fixed conditions into a filter device having a fixed membrane are, S=a·l, and a fixed height of blood flow path b, and the pressure drop, PD, and the volume of filtration flux $Q_F$, will be invariably fixed in accordance with the formulas (I) through (III). In the device of this invention, however, both PD and $Q_F$ are variable according to the formulas (I) through (III) by suitably varying the height, b, of the blood flow path while keeping the other filtration conditions unchanged.

EXAMPLES 13–16

In a device constructed as illustrated in FIG. 8 and FIG. 9, blood was passed under the varying conditions indicated in Table 2, with the volume of filtration flux noted. The results are shown in Table 2. In the table, the width of flow path represents an average value.

In Examples 13–14, plates made of an ethylenevinyl acetate resin consisting of 15% by weight of vinyl acetate and 85% by weight of ethylene 0.6 to 1.0 mm in thickness incorporating protuberances 150 microns in height and 150 mm in diameter were used as flow path regulation plates and membranes of cellulose acetate having a thickness of 150 microns and an average pore diameter of 0.3 to 0.5 micron were used as filter membranes. They were piled up alternately to a total of 30 layers (Example 13) or 46 layers (Example 14). The compressive force was used in four magnitudes of 180 kg, 230 kg, 250 kg and 300 kg. The thickness of blood flow path varied substantially in conformity with the change in the compressive force. This fact implies that possible errors produced in quality among individual devices owing to dispersions in thickness of membranes and dimensional errors were caused to occur during the fabrication of flow path regulation plates and other component parts of devices can be compensated by the suitable variation in the height of blood flow paths, so that the devices can be operated under the optimum conditions. In spite of variations in the Hct value of blood, the volume of blood treated, the temperature, and other various filtration conditions, the optimum heights of blood flow paths can be selected and used.

The conditions involved in Examples 15–16 were similar respectively to those of Examples 13–14, except that the flow path regulation plates were made of polypropylene and the compressive force was used in the magnitudes of 180 kg, 250 kg, 350 kg, and 420 kg. In this case, the height of the blood flow path remained substantially unchanged while the compressive force was in the range of from 250 to 350 kg. The height showed a sudden, ununiform change and the pressure drop notably rose, however, when the compressive force rose to 450 kg. Nevertheless, the volume of filtration flux did not increase and the phenomenon of hemolysis ensured. Consequently, the dispersion in the thickness of membranes and the dimensional errors of the flow path regulation plates heavily affected the quality of devices and caused dispersion of the quality of devices. Compared with the devices used in Examples 13–14, the devices of Examples 15–16 necessitated application of excessively high compressive force and, in extreme cases, sustained breakage. The variation of the height of blood flow path under the compressive force tended to occur ununiformly. This trend had much bearing upon degradation of quality, and hemolysis and coagulation of blood corpuscles.

TABLE 2

| | Structure of device | | | | Flow path regulation plate | | | |
|---|---|---|---|---|---|---|---|---|
| Example | Width of flow path (cm) | Length of flow path (cm) | Number of flow path | Membrane area (cm²) | Material | Young's modulus of elasticity (dyne/cm²) | Height of protuberances (microns) | Surface hardness (Shore hardness, A-scale) |
| 13 | 823 | 4.5 | 30 | 4029 | EVA | $1.0 \times 10^8$–$1.0 \times 10^9$ | 150 | 60–80 |

TABLE 2-continued

| | | | | | | | | |
|---|---|---|---|---|---|---|---|---|
| 14 | 1263 | 4.5 | 46 | 6177 | EVA | $1.0 \times 10^8 - 1.0 \times 10^9$ | 150 | 60–80 |
| 15 | 823 | 4.5 | 30 | 4029 | poly-propylene | $1.0 \times 10^{11} - 1.0 \times 10^{12}$ | 150 | 150–200 |
| 16 | 1263 | 4.5 | 46 | 6177 | poly-propylene | $1.0 \times 10^{11} - 1.0 \times 10^{12}$ | 150 | 150–200 |

| | | | Condition of blood filtration | | | | |
|---|---|---|---|---|---|---|---|
| Example | Shear rate ($\sec^{-1}$) | Blood flow rate (ml/min) | Pressure drop (mm Hg) | Pressure (kg) | Height of flow path (cm) | Average volume of filtration flux per three runs and dispersion (ml/min) | |
| 13 | 111 | 100 | 22 | 180 | 0.010 | 25.0 ± 2.0 | |
| | 140 | | 29 | 230 | 0.0090 | 30.0 ± 2.4 | |
| | 203 | | 44 | 250 | 0.0079 | 40.0 ± 3.0 | |
| | 236 | | 55 | 300 | 0.0073 | 45.0 ± 4.2 | |
| 14 | 156 | 200 | 29 | 180 | 0.010 | 50.0 ± 5.1 | |
| | 193 | | 44 | 230 | 0.0090 | 59.0 ± 6.0 | |
| | 254 | | 58 | 250 | 0.0078 | 73.0 ± 8.4 | |
| 15 | 113 | 100 | 22 | 180 | 0.012 | 25.0 ± 6.0 | |
| | 116 | | 23 | 230 | 0.012 | 25.0 ± 8.1 | |
| | 102 | | 44 | 280 | 0.010 | 26.3 ± 12.0 | |
| | 90 | | 75 | 420 | — | 18.0 ± 18.0 | |
| 16 | 83 | 200 | 29 | 180 | 0.012 | 20.0 ± 6.0 | |
| | 105 | | 44 | 240 | 0.017 | 24.0 ± 7.4 | |
| | 134 | | 58 | 300 | 0.0094 | 29.0 ± 13.0 | |
| | 73 | | 73 | 420 | 0.0128 | 18.0 ± 18.0 | |

I claim:

1. A plasma separator comprising in combination:
a blood filter membrane having an average pore diameter between about 0.1 and 1.0 micron;
a blood flow path regulation plate disposed adjacent to one surface of said filter membrane and provided on at least one surface thereof with a plurality of flexible, elastic, and discontinuous protuberances distributed thereover at fixed intervals, said protuberances having a height of from 50 to 500 microns and contacting the filter membrane to provide a gap between the filter membrane and the flow path regulating plate;
said blood flow path regulation plate and said protuberances having a Young's modulus of elasticity in the range of from $1.0 \times 10^6$ to $2.0 \times 10^{10}$ dynes/cm$^2$;
a filtrate flow path forming plate disposed on the other surface of said filter membrane;
a seal member adapted to prevent the blood and the filtrate from mingling with each other;
a filter device case provided with a blood inlet, a filtration residual blood outlet and a filtrate outlet and formed of at least one upper and one lower plate-like member; and
pressure means adapted to adjustably press said upper and lower plate-like members of said filter device case relatively toward each other;
said blood flow path regulation plate, said blood filter membrane, and said filtrate flow path forming plate being piled up one above the other in the order stated through the medium of said seal member, and being encased in situ within said filter device case between said upper and lower plate-like members which are pressed by said pressure means, to thereby provide a first blood flow path for enabling blood flowing in through the blood inlet to advance through the gap formed between the filter membrane and the flow path regulating plate and, after separation of filtrate by the filter membrane, to be led to the filtration residual blood outlet, and a second blood flow path for enabling the filtrate produced by the filter membrane to be advanced through the filtrate flow path forming plate to the filtrate outlet.

2. A device according to claim 1, wherein the body fluid flow portion provided with protuberances has Young's modulus of elasticity in the range of from $1.0 \times 10^6$ to $2.0 \times 10^{10}$ dynes/cm$^2$.

3. A device according to claim 1, wherein the surface hardness of the body fluid flow path regulation plate provided with the protuberances is 10–100 of shore hardness (A-scale).

4. A device according to claim 1, wherein the protuberances are formed on one surface of the body fluid flow path regulation plate.

5. A device according to claim 4, wherein a body fluid distribution plate is interposed between the upper and lower plate members, and a body fluid filter membrane, a body fluid flow path regulation plate on one side of the membrane and a filtrate flow path forming plate on other side of the membrane are disposed in each of the spaces between the two plate members separating the body fluid distribution plate.

6. A device according to claim 1, wherein the protuberances are formed on both opposite surfaces of the body fluid flow path regulation plate.

7. A device according to claim 1, wherein the distance separating the protuberances on the body fluid regulation plate is in the range of from 100 to 2000 microns.

8. A device according to claim 1, wherein the filter device case comprises a cylindrical lower plate member and a circular upper plate member adapted to be liquid-tightly inserted into said lower plate member.

9. A device according of claim 8, wherein a plurality of circular filter membranes encapsulating therein circular filtrate flow path forming plates are piled up and encased in the cylindrical lower plate member.

10. A plasma separator according to claim 1, wherein said elastic protuberances are approximately semispherical in shape.

11. A plasma separator according to claim 10, wherein the ratio of the radius at the base of each of said protuberances to the distance separating adjacent protuberances falls in the range of from 1:1 to 1:3.

12. A plasma separator according to claim 1, wherein said blood filter membrane is 30 to 200 microns in thickness.

13. A plasma separator comprising in combination:

a blood filter membrane having an average pore diameter between about 0.1 and 1.0 micron;

a blood flow path regulation plate disposed adjacent to one surface of said filter membrane and provided on at least one surface thereof with a plurality of flexible, elastic, and discontinuous protuberances distributed thereover a fixed intervals, said protuberances contacting the filter membrane to provide a gap between the filter membrane and the flow path regulating plate;

the distance between adjacent protuberances on said blood regulation plate being in the range of from about 100 to about 2000 microns;

said blood flow path regulation plate and said protuberances having a Young's modulus of elasticity in the range of from $1.0 \times 10^6$ to $2.0 \times 10^{10}$ dynes/cm$^2$;

a filtrate flow path forming plate disposed on the other surface of said filter membrane;

a seal member adapted to prevent the blood and the filtrate from mingling with each other;

a filter device case provided with a blood inlet, a filtration residual blood outlet and a filtrate outlet and formed of at least one upper and one lower plate-like member; and pressure means adapted to adjustably press said upper and lower plate-like members of said filter device case relatively toward each other;

said blood folw path regulation plate, said flood filter membrane, and said filtrate flow path forming plate being piled up one above the other in the order stated through the medium of said seal member, and being encased in situ within said filter device case between said upper and lower plate-like members which are pressed by said pressure means, to thereby provide a first blood flow path for enabling blood flowing in through the blood inlet to advance through the gap formed between the filter membrane and the flow path regulating plate and, after separation of filtrate by the filter membrane, to be led to the filtration residual blood outlet, and a second blood flow path for enabling the filtrate produced by the filter membrane to be advanced through the filtrate flow path forming plate to the filtrate outlet.

14. A plasma separator according to claim 13, wherein the protuberances on the blood flow path regulation plate have a height in the range of from 50 to 500 microns.

15. A plasma separator according to claim 13, wherein the surface hardness of the blood flow path regulation plate provided with the protuberances is 10-100 of shore hardness (A-scale).

16. A plasma separator according to claim 13, wherein the protuberances are formed on one surface of the blood flow path regulation plate.

17. A plasma separator according to claim 16, wherein a blood distribution plate is interposed between the upper and lower plate members; and a blood filter membrane, a blood flow path regulation plate on one side of the membrane and a filtrate flow path forming plate on other side of the membrane are disposed in each of the spaces between the two plate members separating the blood distribution plate.

18. A plasma separator according to claim 13, wherein the protuberances are formed on both opposite surfaces of the blood flow path regulation plate.

19. A plasma separator according to claim 13, wherein the filter device case comprises a cylindrical lower plate member and a circular upper plate member adapted to be liquid-tightly inserted into said lower plate member.

20. A plasma separator according to claim 19, wherein a plurality of circular filter membranes encapsulating therein circular filtrate flow path forming plates are piled up and encased in the cylindrical lower plate member.

21. A plasma separator according to claim 13, wherein said elastic protuberances are approximately semispherical in shape.

22. A plasma separator according to claim 21, wherein the ratio of the radius at the base of each of said protuberances to the distance separating adjacent protuberances falls in the range of from 1:1 to 1:3.

23. A plasma separator according to claim 13, wherein said blood filter membrane is 30 to 200 microns in thickness.

* * * * *

UNITED STATES PATENT AND TRADEMARK OFFICE
CERTIFICATE OF CORRECTION

PATENT NO. : 4,597,868

DATED : July 1, 1986

INVENTOR(S) : Masaharu WATANABE

It is certified that error appears in the above-identified patent and that said Letters Patent is hereby corrected as shown below:

On the initial page of the patent, change the Title to
--PLASMA SEPARATOR--.

In the Abstract, line 1, change "body fluid" to --plasma separator--.

Column 12 (Claim 3), line 29, change "device" to --plasma separator--.

Column 12 (Claim 3), line 30, change "body fluid" to --blood--.

Column 12 (Claim 4), line 33, change "device" to --plasma separator--.

Column 12 (Claim 4), line 34, change "body fluid" to --blood--.

UNITED STATES PATENT AND TRADEMARK OFFICE
CERTIFICATE OF CORRECTION

PATENT NO. : 4,597,868          PAGE 2 OF 3.

DATED      : July 1, 1986

INVENTOR(S) : Masaharu WATANABE

It is certified that error appears in the above-identified patent and that said Letters Patent is hereby corrected as shown below:

Column 12 (Claim 5), line 36, change "device" to --plasma separator--.

Column 12 (Claim 5), line 38, change "body fluid" to --blood--.

Column 12 (Claim 5), line 39, change "body fluid" to --blood--.

Column 12 (Claim 5), line 43, change "body fluid" to --blood--.

Column 12 (Claim 6), line 44, change "device" to --plasma separator--.

Column 12 (Claim 6), line 46, change "body fluid" to --blood--.

UNITED STATES PATENT AND TRADEMARK OFFICE
CERTIFICATE OF CORRECTION

PATENT NO. : 4,597,868

DATED : July 1, 1986

INVENTOR(S) : Masaharu WATANABE

It is certified that error appears in the above-identified patent and that said Letters Patent is hereby corrected as shown below:

Column 12 (Claim 7), line 47, change "device" to --plasma separator--.

Column 12 (Claim 7), line 48, change "body fluid" to --blood--.

Column 12 (Claim 8), line 51, change "device" to --plasma separator--.

Column 12 (Claim 9), line 55, change "device" to --plasma separator--.

Signed and Sealed this

Thirteenth Day of January, 1987

*Attest:*

DONALD J. QUIGG

*Attesting Officer*    *Commissioner of Patents and Trademarks*